United States Patent [19]

Orsini

[11] 4,250,135
[45] Feb. 10, 1981

[54] ROLLER FOR PRODUCING CONTINUOUS SUEDED OR GRIT TYPE FINISH AND METHOD OF MAKING

[76] Inventor: Peter C. Orsini, 81 Hemlock Dr., Paramus, N.J. 07652

[21] Appl. No.: 39,962

[22] Filed: May 17, 1979

[51] Int. Cl.³ .................. B29C 1/02; B29C 15/00
[52] U.S. Cl. .................................. 264/227; 51/295; 51/297; 264/220; 264/284; 425/175; 425/363; 425/385; 425/471
[58] Field of Search ............ 425/363, 175, 385, 471; 264/284, 293, 162, 220, 225, 226, 227; 51/295, 297, 309

[56] References Cited

U.S. PATENT DOCUMENTS

| | | | |
|---|---|---|---|
| 1,477,663 | 12/1923 | Poston | 264/284 |
| 2,890,540 | 6/1959 | Britt | 264/284 |
| 3,023,121 | 2/1962 | Dyar | 51/295 |
| 3,508,890 | 4/1970 | Fontanella | 51/295 |
| 3,539,671 | 11/1970 | Nauta | 264/162 |
| 3,540,959 | 11/1970 | Connor | 264/284 |
| 3,565,978 | 2/1971 | Folger et al. | 264/293 |
| 3,615,309 | 10/1971 | Dawson | 51/295 |
| 3,859,110 | 1/1975 | Foster et al. | 264/293 |
| 3,876,491 | 4/1975 | Martel | 264/284 |
| 4,099,934 | 7/1978 | Suzuki et al. | 51/295 |

*Primary Examiner*—James B. Lowe
*Attorney, Agent, or Firm*—Ralph R. Roberts

[57] ABSTRACT

The present invention is directed toward the production of a roller or rollers which impart to plastic material in strip form and of indeterminate length a surface resembling a sueded material. The produced surface is seamless and continuous. Heretofore plastic material to reproduce sueded finish was not and could not be produced with an embossing roller since an embossing roller did not reproduce the genuine suede look or feel. Hand engraved rollers, etched rollers and the like have failed to give a genuine suede look to plastic material and sheeting. Small area sections may be reproduced by hand engraved flat plates then abrading of sheet or roll material which is expensive and wasteful has also been accomplished. Embossing rolls have been used for producing special surfaces such as skin reproductions for example, lizzard, alligator, etc. The use of a grit to produce a reverse master which is then electro-reproduced with the resulting sleeve mounted on a roller produces the desired embossing surface and the sueded reproduction. Grit surface material from AR 3 to 3 M 50 has and may be employed.

7 Claims, 7 Drawing Figures

ROLLER FOR PRODUCING CONTINUOUS SUEDED OR GRIT TYPE FINISH AND METHOD OF MAKING

BACKGROUND OF THE INVENTION

Description of the Prior Art

Suede material "particularly leather" has a brushed and abraded appearance and feel. Heretofore a sueded appearance has been made and is available in and on plastic material by initially making the roll or sheet material in an excess thickness. This material, on one side, is subjected to an abrading action by which about seven-thousandths of an inch or more is removed leaving the surface with a brushed sueded appearance. This abrading is fine, medium or course depending upon the desired appearance of the resulting suede product.

A Pre-Ex search was made and the following patents were found and are considered pertinent. U.S. Pat. No. 1,863,976 to FISCHER as issued on June 21, 1932 shows the use of embossing rolls but not their construction as in and by the invention disclosed hereinafter. The use of embossing rolls is well shown and known. Embossing ornamentation is shown in U.S. Pat. No. 2,095,199 to SPEED as issued on Oct. 5, 1937 and particularly in U.S. Pat. No. 2,514,213 to MASON et al. as issued on July 4, 1950. A method of forming a raised image is shown in U.S. Pat. No. 2,955,052 to CARLSON et al. as issued Oct. 4, 1960. Using grit blasted rolls is disclosed in U.S. Pat. No. 3,051,080 to CLARKE as issued on Aug. 28, 1962 and also to be noted is the irregular finish as used on a substrate. This is shown in U.S. Pat. No. 3,859,110 to FOSTER et al. as issued on Jan. 7, 1975.

In these and other known embossing roller concepts the production of plastic material with a sueded appearance is novel. The production of the sueded appearance and feel heretofore on plastic has been by abrading or in the use of hand engraved plates. Production of a suede finish by feel and appearance in a seamless plastic roll by an embossing roller or rollers heretofore has not been achieved.

In the present invention the sueded appearance and feel is imparted to plastic strips without an abrading process. This appearance and feel is implanted by embossing rolls without the necessity of further treatment. The plastic material, so embossed, is by an inexpensive production technique and produces a seamless and continuous surface. The grit used to produce the embossing rolls determines the closeness or coarseness of the resulting product.

SUMMARY OF THE INVENTION

It is an object of this invention to provide, and it does provide, an embossing roller to produce on certain plastic sheet material a sueded appearance and feel, such produced material being seamless and continuous.

It is a further object of this invention to provide, and it does provide, a method of producing an embossing roller used in the finish of plastic sheeting to reproduce on said plastic sheet a sueded appearance which not only appears like suede leather but also has the feel of genuine suede.

In brief the plastic sheet or roll material is embossed by a roller to produce the appearance and feel of suede. A novel method of producing the embossing roller is contemplated and employed. A roller of metal has a smooth or nearly smooth outer surface. This roller is coated with an adhesive that is cured or dried by air or heat. With and while the adhesive is still wet on the roller, a grit such as aluminum oxide is completely and evenly distributed on the outer surface of the roller. The roller with the grit covered surface is now cured or dried after which this roller can be used to produce the desired embossing finish to the roll sheet plastic. The embossing roller having grit embedded in cement does not have a very long life so further steps are used to produce an embossing roller with the desired surface and a long life. A master sleeve is now made of the grit covered roller. Vinyl plastisol or any other suitable material is now made as a covering of the grit roller. After curing or fusing this sleeve is now removed and as a master, a reverse metal sleeve is now made from the plastisol reverse master. The electro form deposition process is preferably used to make this sleeve which is now slipped over a metal roller. This embossing roller with the grit impressions is now used to emboss the plastic sheet material. There has been chosen a specific embodiment of a grit embossed roller for producing a suede finish and appearance on a plastic strip as adopted for use in a continuous and seamless manner and showing a preferred means for producing a roller having the desired surface characteristics. This specific embodiment has been chosen for the purpose of illustration and description as shown in the accompanying drawing wherein:

BRIEF DESCRIPTION OF THE DRAWING

In the following description and in the claims various details are identified by specific names for convenience. These names are intended to be generic in their application. Corresponding reference characters refer to like members throughout the several figures of the drawings.

Figure 1:
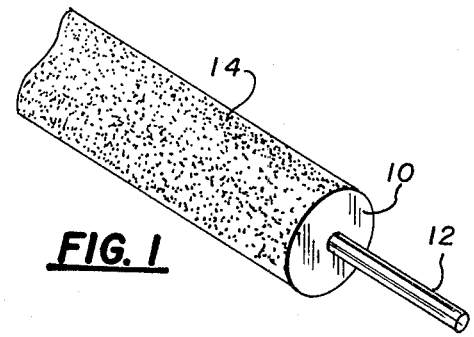
FIG. 1 represents an isometric view of the right end of a metal roller prior to further processing.

The drawing accompanying, and forming part of, this specification disclose details of construction for the purpose of explanation but structural details may be modified without departure from the concept and principles of the invention and the invention may be incorporated in other structural forms than shown.

DESCRIPTION OF THE PREFERRED EMBODIMENT

Referring now to the drawing in detail, there is shown a method of making a roller to produce a sueded finish to a plastic strip. FIG. 1 represents the base roller which is identified as 10 and as depicted is mounted on a shaft or spindle 12. Preferably the outer surface 14 of this roller is lightly surface treated as by a sand blast to present a surface adapted to retain an adhesive or other coating to be utilized.

PREPARATION OF THE ROLLER AS IN FIG. 2

Figure 2:
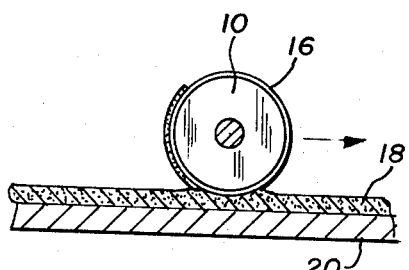
FIG. 2 represents an end view, partly diagrammatic, of the metal roller of FIG. 1 with the outer surface of the roller coated with wet adhesive and with the adhesive coated roller dipped with grit.

Referring to FIG. 2 and the procedure depicted therein it is to be noted that the roller 10 has now been coated on its outer surface with an adhesive 16. This adhesive may be applied by any conventional means such as spraying, roller coating, printing, etc. An epoxy type adhesive is the preferred type. While the adhesive is still wet on the roller outer surface, the roller is rolled, rotated or otherwise coated with evenly distributed grit. As depicted, grit 18 is carried on a support means such as a plate 20. The grit externally supplied usually is as coarse as M 3 and as fine as M 50 but these are not limiting since grip material for golf clubs, etc. may require a coarser grit. Aluminum oxide grit is very satisfactory. The roller is completely and evenly coated with the selected grade of grit and in this coated condition the roller is now dried or cured as by heat.

Such a grit covered roller can now be used to produce the sueded feel and appearance to a plastic strip. As this roller is easily damaged this roller is not used for production runs of plastic.

MASTER SLEEVE AS IN FIG. 3

Figure 3:
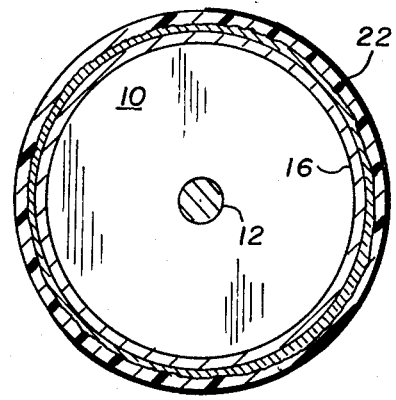
FIG. 3 represents the roller of FIG. 2 in an enlarged scale and showing the roller with adhesive and grit which after curing is now covered with a plastisol outer cover.

Referring next to the diagrammatic representation as in FIG. 3 (enlarged scale) the roller 10 and its cured adhesive 16 with the coating of grit 18 is further covered by a flexible material such as plastisol 22. Any other suitable material can be used if it is susceptible for removal intact after curing or fusing. After curing or fusing this cover is removed intact with the impression of each grit portion impressed upon this master sleeve 22. A vinyl plastisol makes a very satisfactory sleeve and produces a true impression of the grit surface.

MASTER SLEEVE AS IN FIGS. 4 AND 5

Figure 4:
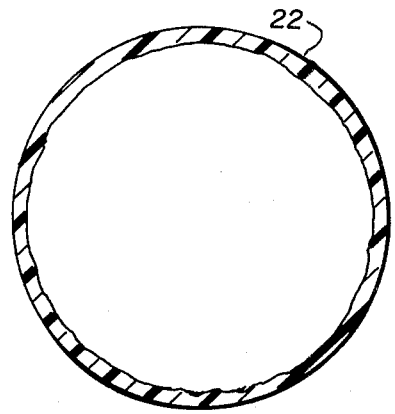
FIG. 4 represents the outer cover of cured plastisol after removal from the grit covered roller of FIG. 3.
Figure 5:
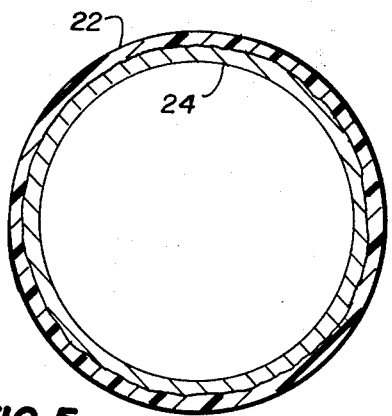
FIG. 5 represents the reverse sleeve of FIG. 4 with an electro-form produced on the inner surface.
Figure 6:
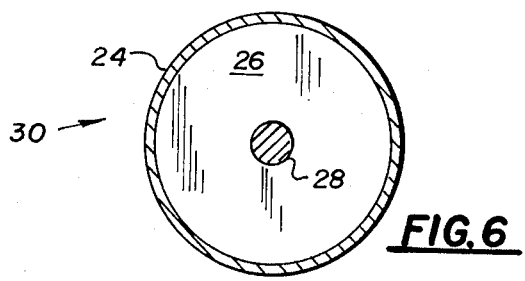
FIG. 6 represents the electro-formed sleeve of FIG. 5 as depicted in a reduced scale and showing the roller with the reverse sleeve now mounted on a roller core.

The removed master sleeve 22 is seen in FIG. 4 and after removal it (the master) is placed in a plating bath whereat a reverse metal sleeve 24 is deposited by the electro form or similar process in the master 22. The metal deposited is only a few thousandths of an inch in thickness but makes a true impression of the imbedded grit in the master sleeve. Preferably the metal is sufficiently hard as to withstand wear and use.

GRIT REPRODUCED ROLLER OF FIG. 6

This metal sleeve 24 is now fixedly mounted on a finished metal roll 26 which normally is carried by and on a shaft 28. This grit type faced finished metal roller 30 is now used with and in a typical embossing process.

FINISHED PLASTIC STRIP AS IN FIG. 7

Figure 7:
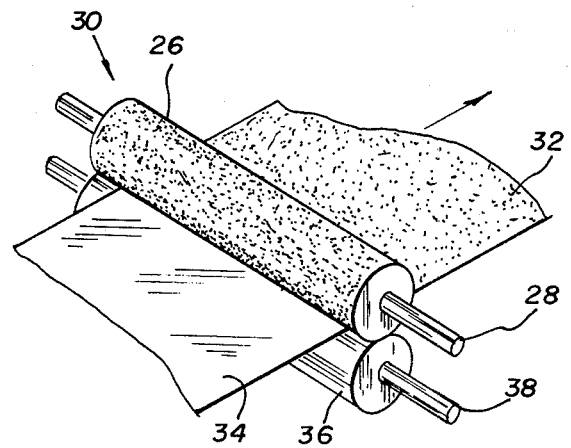
FIG. 7 represents the roller of FIG. 6 with a plain backup roller arranged for producing a sueded appearance and feel to a plastic strip.

Referring next and finally to the suede finishing production as depicted in FIG. 7 it is to be noted that the grit type finished roller 30 is rotated by shaft 28 to produce a desired embossed suede surface 32 on the strip of plastic 34. A support roller 36 as carried by a shaft 38 mates with roller 30 to emboss the advanced plastic sheet 34.

The above described embossing roller is not only novel in its production of a suede finish on plastic sheeting but also indicates a novel method of producing such an embossing roller. This method includes a method of forming an embossing roller having an outer surface contoured to produce in and on one face of a strip of sheeting such as plastic, a grit or suede finished surface without further finishing of said embossed surface, the method steps of forming this embossing roller including: providing a support roller of metal and of a given length and of regular diameter; forming and securing an outer surface on the support roller of a selected grit surface of not less than M 3 and not more than about M 50; mounting this roller on a shaft means and carrying this roller on said shaft for a given axial rotation; rotating said roller in a given direction and speed, and feeding said sheet material to and through means whereby said embossing roller imparts to the sheet material a grit surface of desired depth, appearance and feel.

In addition to the broad method of forming an embossing roller particular steps of forming also include: forming the grit surface by applying a metal fusible grit to the outer surface of said support roller and heating the grit particles to a high enough temperature to fuse the fusible particles to the outer surface of of the roller.

As an alternate to the applying of grit to a support roller the step of forming may include: forming the grit surface by applying a non-metallic fusible grit to the outer surface of said support roller and heating the grit particles to a high enough temperature to fuse the fusible particles to the outer surface of the roller.

It is also to be noted that the grit surface may be and is preferably formed on the embossing roller by applying a wet adhesive to an outer surface of a support roller; drying or curing this wet adhesive after a given depth of grit is applied to and is impressed into the wet adhesive on the support roller; covering this grit surface by a flexible covering such as plastisol and then curing or drying the flexible covering; removing the cured flexible covering to provide a reverse master in which is reproduced the grit projections; plating the inner surface of the reverse master to produce a plating deposition on said inner surface, and securing this plating sleeve on an embossing roller to provide the desired grit formation and reproduction.

The forming of the plating step can be by electro-forming and the master sleeve can be formed by plastisol or by a plastic sheeting which is first pressed into the grit surface and then is cured before removing from the grit master.

The above described roller is contemplated for the production of a suede finish on plastic sheeting but it may be employed for embossing a material having other grit surfaces or appearances. Preferably the grit is coated or applied on a roller having a wet adhesive but any other suitable securing method can be employed as long as an even layer of graded grit is secured to the roller. Aluminum oxide as mentioned is relatively inexpensive and available but other grit or grit-like material can be employed.

The plastisol is a rather fluid-like material and is easily applied to the grit-like surface. A sheet material can also be employed which is then heated and pressed to the grit surfaced roller. After curing the master sleeve is then removed. This master sleeve is used for electroforming as above. Rather than aluminum oxide a metallic, fusible grit can be directly secured to a roller. The roller and applied grit is heated to a sufficiently high temperature to fuse the grit particles directly to the roller to produce the desired roller surface.

While a particular embodiment of the roller and method of making is shown and described it is to be understood the invention is not limited thereto since modifications may be made within the scope of the accompanying claims and protection is sought to the broadest extent the prior art allows.

What is claimed is:

1. A method of forming an embossing roller having an outer surface contoured to produce in and on one face of a strip of plastic sheeting a grit or suede finished surface without further finishing of said embossed surface, the method steps including:
   (a) providing a support roller of metal and of a given length and of regular diameter;
   (b) forming and securing an outer surface on the support roller of a selected grit surface made from externally furnished grit material, said grit surface formed of hard metal and with a substantially true representation of the externally furnished grit, said grit surface formed on the embossing roller by;
   (c) applying a wet adhesive to an outer surface of a support roller;
   (d) drying or curing this wet adhesive after a given depth of grit is applied to and is impressed into the wet adhesive on the support roller;
   (e) covering this grit surface by a flexible covering and then curing or drying the flexible covering;
   (f) removing the cured flexible covering to provide a reverse master in which is reproduced the grit projections;
   (g) plating the inner surface of the reverse master to produce a plating deposition on said inner surface;
   (h) securing this plating sleeve on an embossing roller to provide the desired grit formation and reproduction;
   (i) mounting this roller on a shaft means and carrying this roller on said shaft for a given axial rotation;
   (j) rotating said roller in a given direction and speed, and
   (k) feeding said sheet material to and through opposed pair and inwardly turning rollers with the embossing roller one of the opposed pair whereby said embossing roller imparts to the sheet material a grit surface of desired depth, appearance and feel.

2. A method of forming an embossing roller as in claim 1 in which the flexible covering is plastisol.

3. A method of forming an embossing roller as in claim 1 in which the step of plating is by electroforming.

4. A method of forming an embossing roller as in claim 1 which further includes forming the grit surface on the embossing roller by applying a wet adhesive to an outer surface of a support roller; drying or curing this wet adhesive after a given depth of grit is applied to and is impressed into the wet adhesive on the support roller; covering this grit surface by a flexible covering made from a plastic sheeting which is heated and urged into formation contact with the grit surface.

5. A method of forming an embossing roller as in claim 4 in which the step of plating the reverse master is by electroforming.

6. An embossing roller having an outer surface contoured to produce in and on one face of a strip of plastic sheeting a grit or suede finished surface without further finishing of said embossed surface, this embossing roller including:
   (a) a support roller of metal of a given length and of a regular diameter to provide a base roller;
   (b) an outer surface formed and secured to the support roller and having a metallic reproduction of a selected grit surface made from externally furnished grit material, said grit surface formed of hard metal and with a substantially true representation of externally furnished grit, said grit surface formed on a sleeve mounted on said support roller, the grit surface produced by plating a reverse master to provide the metallic reproduction of the grit surface on said sleeve;
   (c) a shaft means by which the roller is carried for a given axial rotation;
   (d) means for rotating said roller in a given direction and speed, and
   (e) means for feeding said strip of sheet material to and through opposed pair and inwardly turning rollers with the embossing roller one of the opposed pair whereby said embossing roller imparts to the sheet material a grit surface of desired depth, appearance and feel.

7. An embossing roller as in claim 6 in which the plating deposition in the reverse master is by electroforming.

* * * * *